United States Patent [19]
Schuster

[11] Patent Number: 5,742,439
[45] Date of Patent: Apr. 21, 1998

[54] APOCHROMATIC WIDE-ANGLE OBJECTIVE

[75] Inventor: Karl-Heinz Schuster, Bad Wurzach, Germany

[73] Assignee: Carl-Zeiss-Stiftung, Heidenheim, Germany

[21] Appl. No.: 529,069

[22] Filed: Sep. 15, 1995

[30] Foreign Application Priority Data

Sep. 15, 1994 [DE] Germany .................. 44 32 872.9

[51] Int. Cl.⁶ ...................................... G02B 13/04
[52] U.S. Cl. .............................. 359/749; 357/752
[58] Field of Search ...................... 359/749, 750, 359/637, 751, 752, 753

[56] References Cited

U.S. PATENT DOCUMENTS 3,687,523  8/1972  Schlegel et al. .................. 359/797
3,883,229  5/1975  Determann et al. .............. 359/745
3,883,230  5/1975  Determann et al. .............. 359/745
4,331,391  5/1982  Baker ................................ 359/749
5,257,136  10/1993 Cobb et al. ....................... 359/753
5,634,159  5/1997  Caregnato ........................ 396/327

OTHER PUBLICATIONS

"Bauelemente der Optik: Taschenbuch der Konstrukteure" by H. Naumann et al. 1983, Munich, pp. 52 to 55.

*Primary Examiner*—David C. Nelms
*Assistant Examiner*—Ricky Mack
*Attorney, Agent, or Firm*—Walter Ottesen

[57] ABSTRACT

An apochromatic wide-angle objective has an improved correction of transverse chromatic aberration while at the same providing a high correction of other errors. These corrections are obtained utilizing long-crown and short-flint glasses.

19 Claims, 6 Drawing Sheets

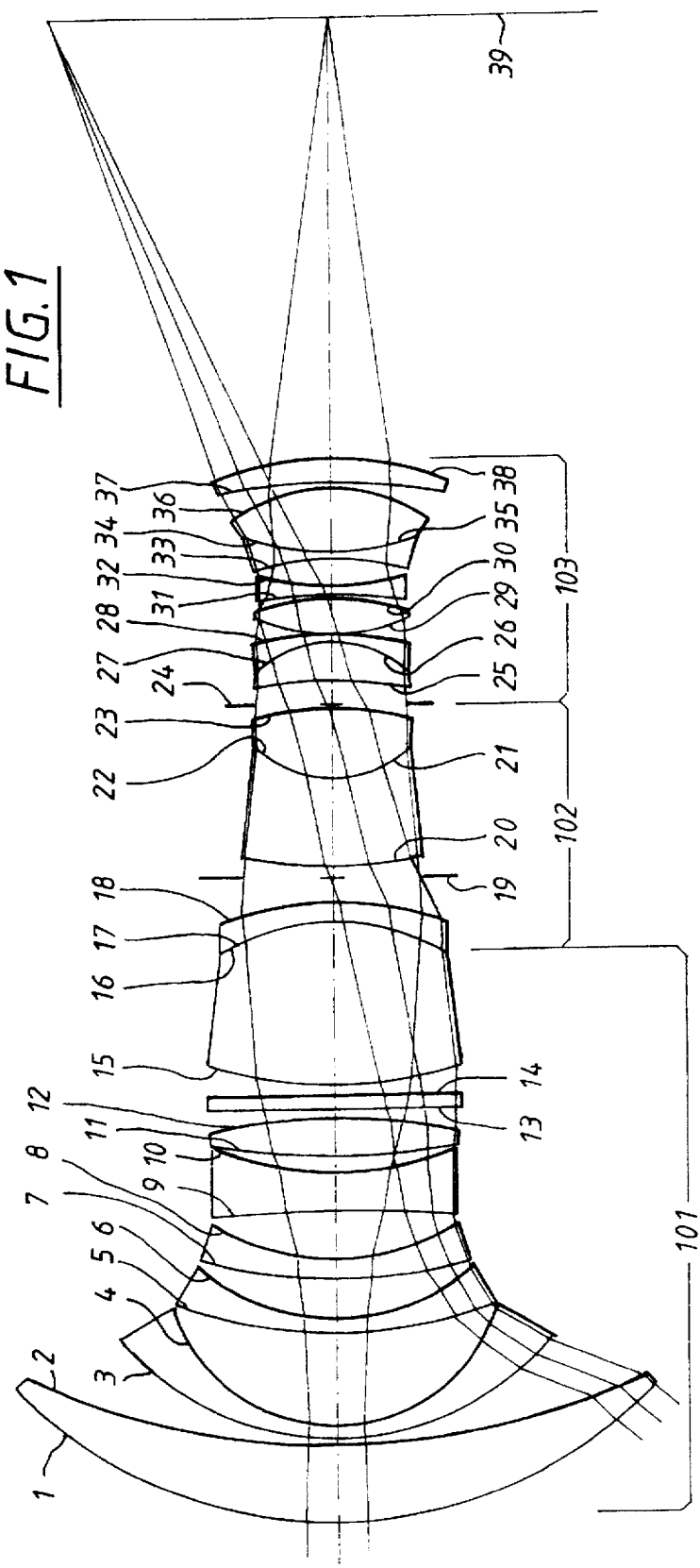
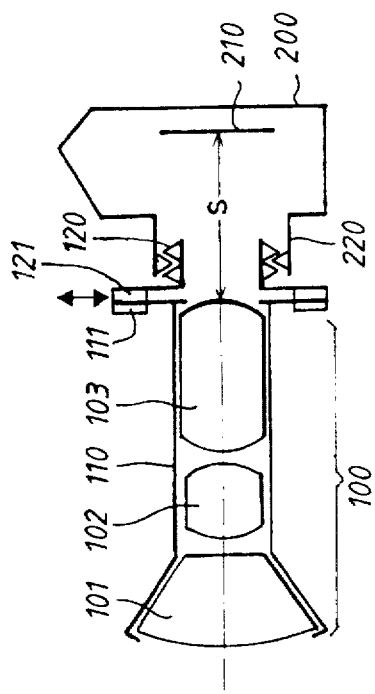

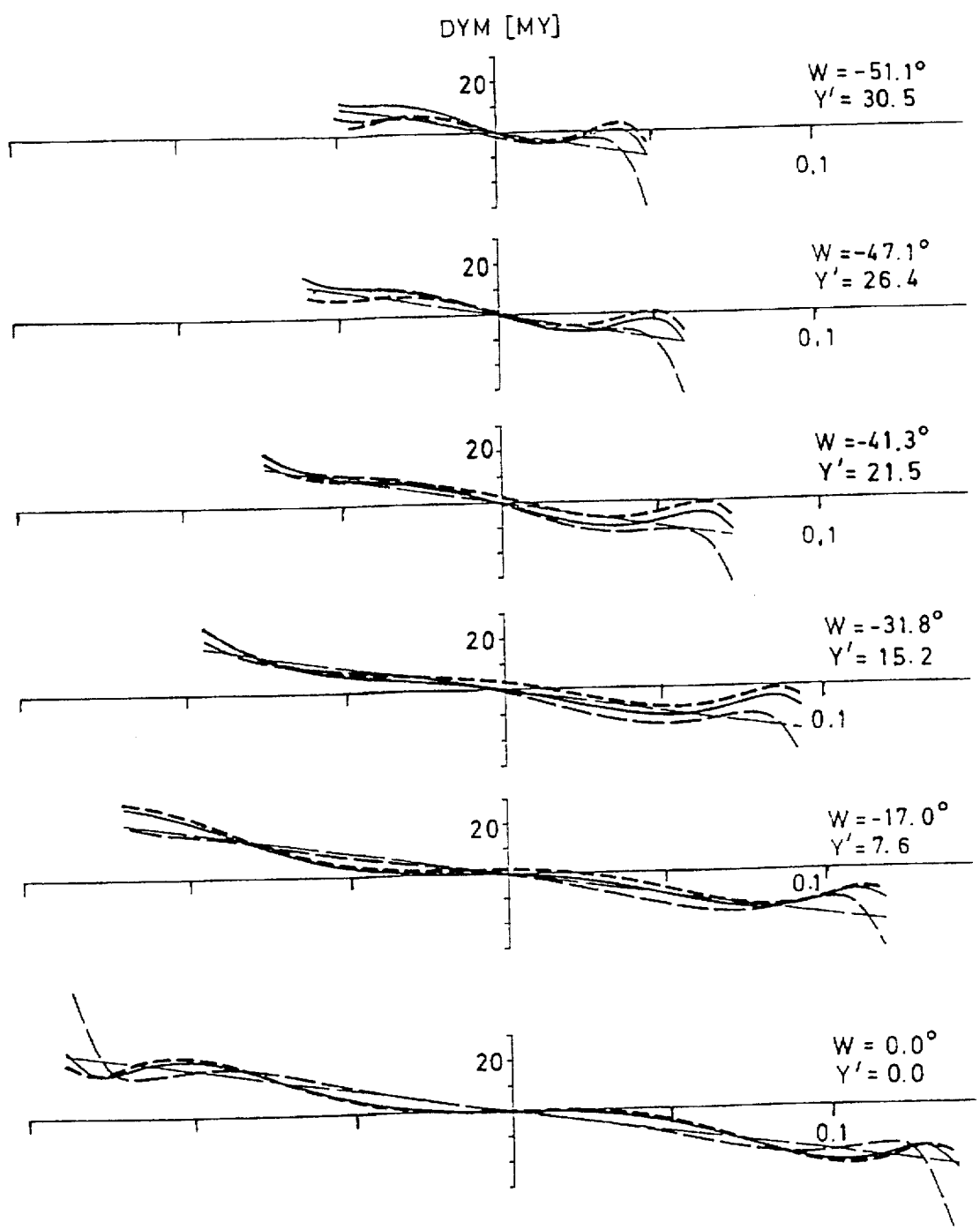

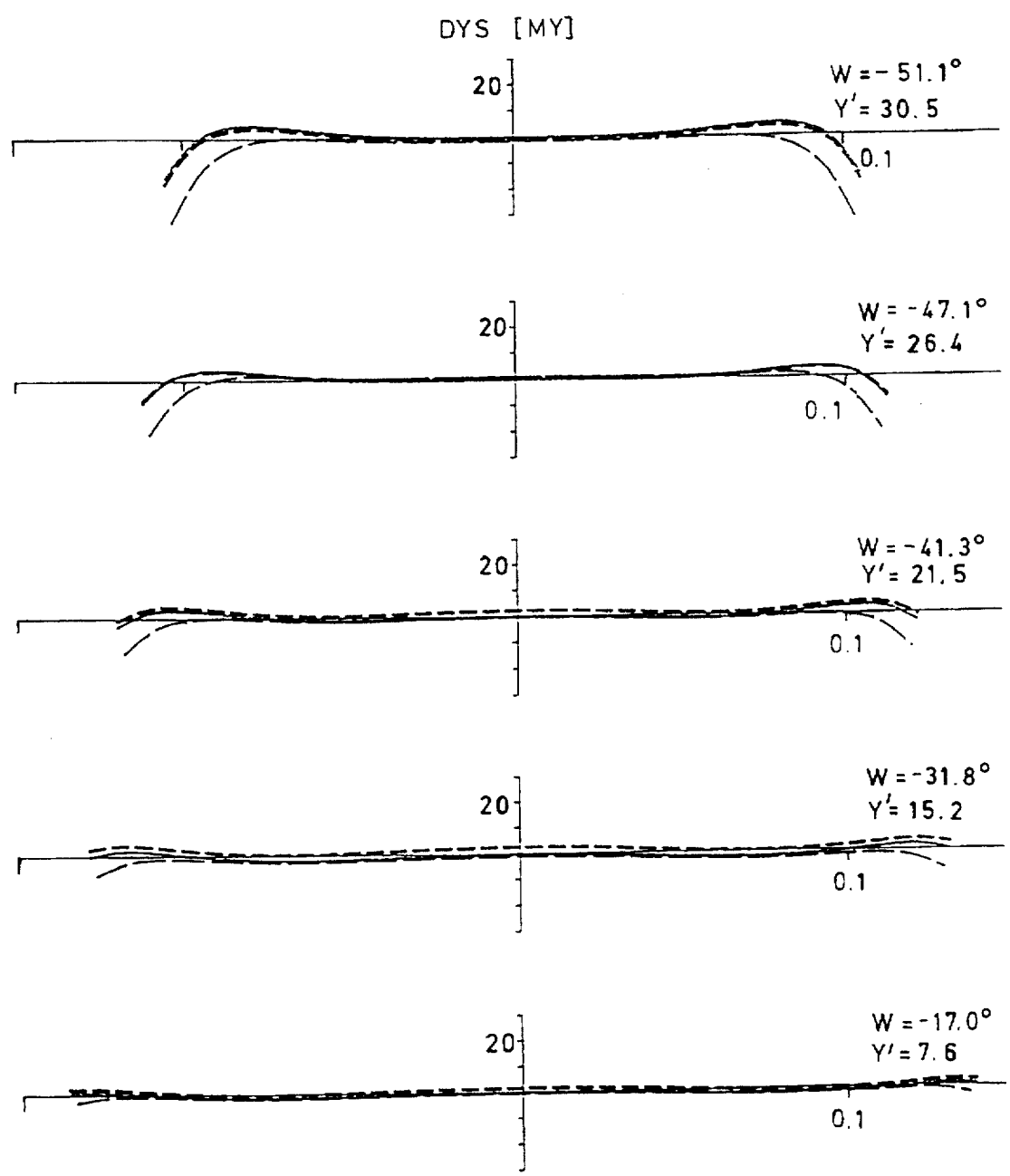

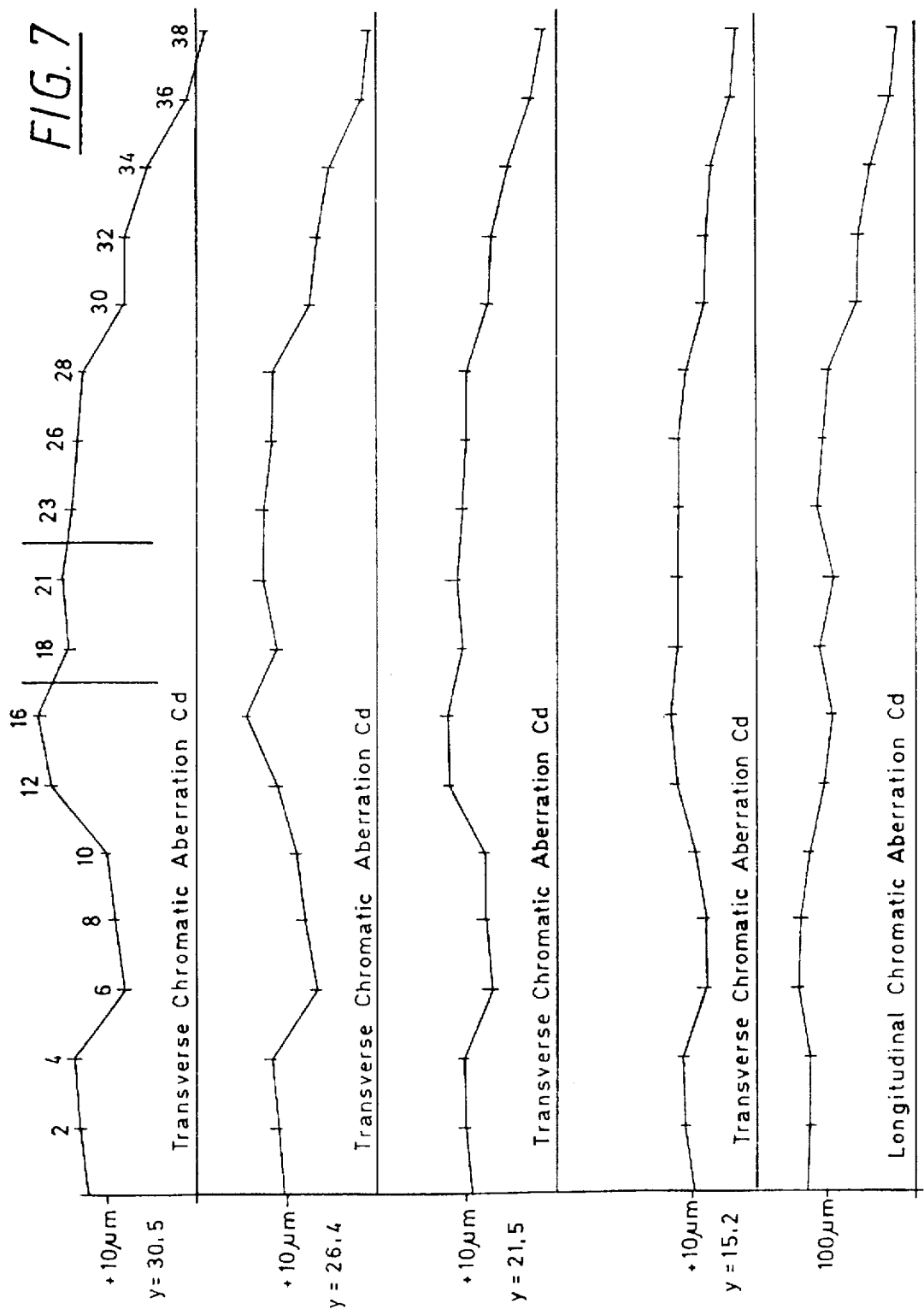

APOCHROMATIC WIDE-ANGLE OBJECTIVE

FIELD OF THE INVENTION

The invention relates to an apochromatic wide-angle objective wherein: the majority of the lenses have considerable anomalous partial dispersion, the majority of the converging lenses behind the system diaphragm are of the long-crown type and the majority of the convex lenses are of the short-flint type.

BACKGROUND OF THE INVENTION

An objective of this kind was presented at the "Photokina 1992" in Cologne under the designation Carl Zeiss Distagon 2.8/21 mm No. 104926 configured as a wide-angle objective for miniature cameras, such as 24×36 mm$^2$ cameras. In this objective, most lenses forward of the diaphragm having positive refractive power are made of glasses having anomalous partial dispersion and are of the short-flint type. Most lenses having a negative refractive power are made of the long-crown type. After the diaphragm, the association of the sign of the refractive power is inverted with respect to the glass type. In this way, the correction of the transverse chromatic aberration for three wavelengths and three image heights was made possible by continuous reduction from lens to lens.

However, in the above, it is not possible to simultaneously optimally correct the oblique spherical aberration which would require a different refractive power distribution over the lenses.

The full image quality is obtained with this objective, as with other commercially available wide-angle objectives, only after stopping down approximately two stop numbers with respect to the nominal full opening.

SUMMARY OF THE INVENTION

It is an object of the invention to provide an apochromatically corrected wide-angle objective wherein the transverse chromatic aberration and the oblique spherical aberration are corrected to a great extent. The highest image quality should already be available when the aperture is completely open, that is, the objective is set to its smallest stop number. An embodiment defining an apochromatic perspective compensating wide-angle objective is also provided.

A front lens made of glass having anomalous partial dispersion is introduced which is so configured that it generates a transverse chromatic aberration which is in addition to that which occurs for normal glass. It was surprisingly found that introducing a front lens made of this glass made it possible, together with further lenses made of such glass types, to obtain the correction of the transverse chromatic aberration and simultaneously realize a progression of the refractive powers which permits a correction of the oblique spherical aberration. Overall, a correction is possible in this manner which results in a complete image quality up to the full opening (minimum stop number). In this way, the exposure latitude available to a photographer is significantly expanded.

The apochromatic wide-angle objective of the invention is for viewing an object. The objective includes: a plurality of lenses defining an optical axis and more than half of the lenses having anomalous partial dispersion; the plurality of lenses being subdivided into first and second groups of lenses; a system diaphragm mounted on the axis between the first and second groups; the first group of lenses having a front lens facing toward the object; the front lens being a converging lens made of a long-crown type of glass; the second group of lenses including a plurality of converging lenses and a plurality of diverging lenses; and, more than half of the converging lenses of the second group being made of a long-crown type of glass and more than half of the diverging lenses of the second group being made of a short-flint type of glass.

According to another feature of the invention, a forward group, which deliberately increases the transverse chromatic aberration, and a center group, which reduces this aberration, are provided forward of the system diaphragm.

According to another feature of the invention, preferred tolerances are provided when other than long-crown or short-flint glasses are used which cannot always be avoided.

Preferably, the front lens significantly increases the transverse chromatic aberration. The front lens is preferably a meniscus having a convex front surface because the objective is then especially compact.

In an advantageous embodiment, a composite lens made of two lenses of glass is provided forward of the system diaphragm. The dispersion functions of these lenses in the spectral range used are distinguished from each other only by a constant, that is, the lenses have different refractive indices but the same Abbe number and the same anomalous partial dispersions.

In this way, a surface is made available which is without influence with respect to the chromatic errors and which can be used for correcting the remaining imaging errors.

While the front lens increases the transverse chromatic aberration, this aberration is well corrected by the entire objective in a preferred embodiment for three wavelengths over all field angles. Likewise, it is a special advantage of the invention that the oblique spherical aberration of the sagittal imaging is well corrected.

The objective is preferably configured as a retrofocus objective and especially as an interchangeable lens and is especially suited as a shift objective. The embodiment according to the invention leads to a good correction even for the problems caused by the backfocus distance which is necessarily large.

A lens made of long-crown glass Hoya ATF 2 is used or a lens made of the glass known as Hoya ADC 1. The glass Hoya ATF 2 is a long-crown glass which is known for its athermal characteristic and is used only in special objectives where this characteristic is needed. The Hoya ADC 1 glass is likewise of the long-crown type and is especially suited for the front lens. Glasses of other manufacturers having practically the same optical characteristics are likewise suitable.

The designations "long crown" and "short flint" identify optical glasses with respect to their partial dispersion. In a primary dispersion/partial dispersion diagram v, P the Abbe normal is determined by the glass pair K7, F2 (Schott). Most conventionally available optical glasses are close to this normal straight line.

Glasses of the long-crown type have a significantly lower partial dispersion. Glasses of the short-flint type have a significantly higher partial dispersion than the glasses which lie on the Abbe normal straight line, that is, they have an anomalous partial dispersion.

There are, however, various definitions of primary dispersion (v) and partial dispersion (P) in use which refer to different spectral lines. In this context, reference can be

3 made to the text of H. Naumann et al entitled "Bauelemente der Optik" published by Carl Hanser Verlag, Munich, 1983, pages 52 and 55. Here, it is stated that at least one type of glass having anomalous partial dispersion must be used for apochromatization.

Here, an apochromatization for the following lines is delineated:

g: blue mercury line at 435.84 nm;

d: yellow helium line at 587.56 nm; and,

C: red hydrogen line at 657.27 nm and achromatized for g, d.

The primary dispersion is defined as:

$$v = \frac{n_d - 1}{n_g - n_d}$$

This equation is therefore only characterized by the indices of refraction at two lines.

The partial dispersion is defined as:

$$P = \frac{n_d - n_C}{n_g - n_d}$$

Thus, an extrapolation of the refractive index is carried out toward the third line C.

The Abbe normal straight line for K2, F7 has, with this definition, the form $$P_n = A \cdot v + B$$

and the deviation therefrom as a relative partial dispersion is given as:

$$\Delta P = P - A \cdot v - B \text{ with}$$

$$A = 0.9007 \cdot 10^{-4} \text{ and } B = 0.2025.$$

A uniform distribution of commercially available glass types about the normal straight line results over the entire range of the primary dispersion values compared to the normal straight lines defined above and with the primary dispersion v and partial dispersion P defined above. The distinction fixed thereby of long-crown, normal and short-flint glasses corresponds well to the requirement to select a glass for pregiven primary dispersion which has a relatively pronounced partial dispersion amongst the glasses available.

According to another feature of the invention, the selection of the glasses in accordance with the definition given above is especially advantageous.

An especially advantageous embodiment of the objective of the invention can be scaled for other focal lengths by the scale of the focal length ratio.

BRIEF DESCRIPTION OF THE DRAWINGS

The invention will now be described with reference to the drawings wherein:

FIG. 1 is a lens section view taken through an Apo-Distagon 3.5/25 mm objective according to the invention;

FIG. 2 is a schematic representation of a shift interchangeable objective mounted on a camera;

FIG. 5 is a diagram of the total transverse aberration in the meridional section for the objective of FIG. 1;

4

Figure 3:
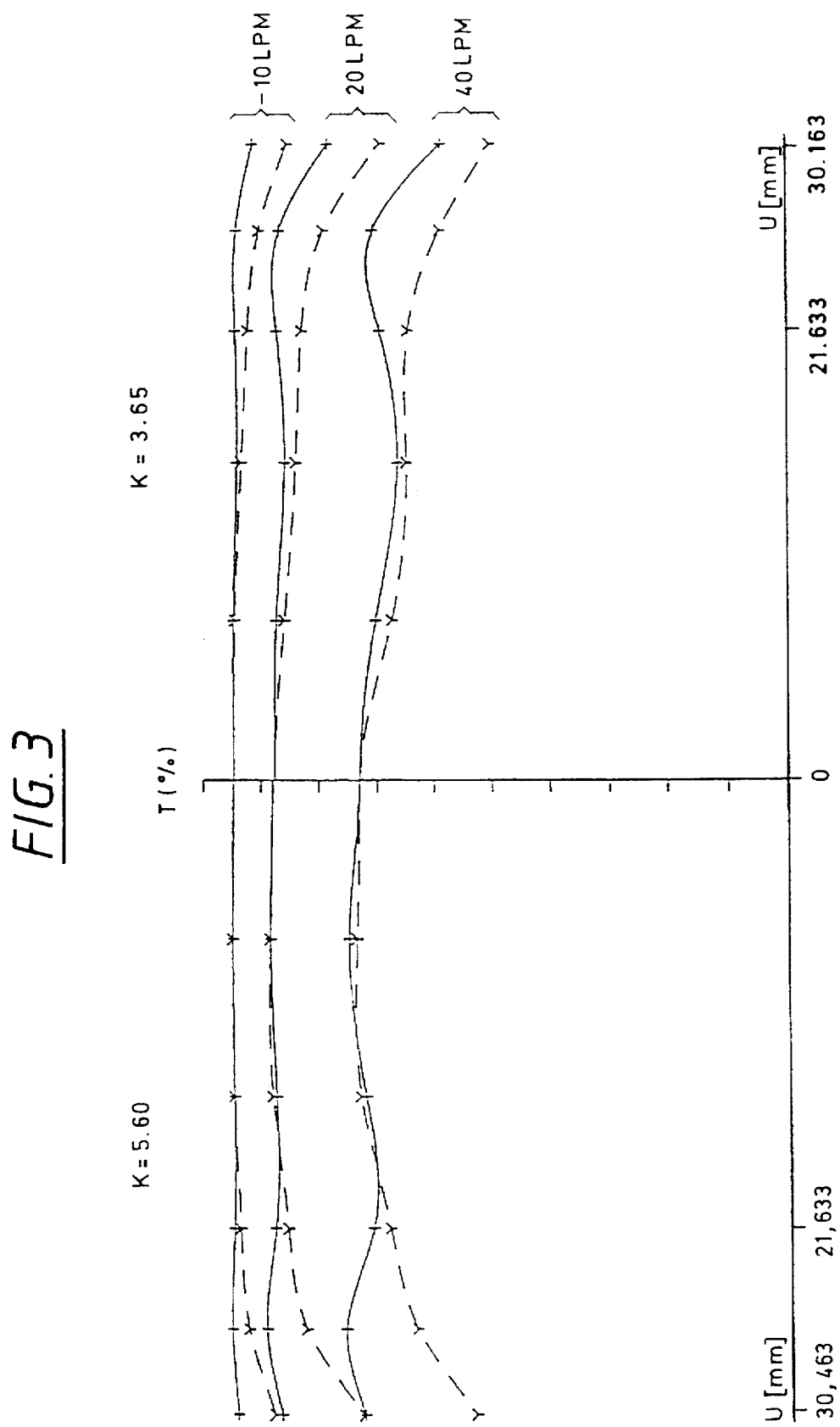
FIG. 3 is a diagram of a modulation transmission function for the objective of FIG. 1.

FIG. 6 is a diagram of the sagittal coma of the objective of FIG. 1; and,

FIG. 7 is a diagram showing the progression of the transverse chromatic aberration and longitudinal chromatic aberration over the lenses of the objective of FIG. 1.

DESCRIPTION OF THE PREFERRED EMBODIMENTS OF THE INVENTION

The main rays for minimum and maximum image angle are shown in the lens section of FIG. 1. Table 1 presents the following: the radii of the surfaces 1 to 39, the thicknesses and the glass types as well as further essential data of the objective. Surface 39 is the image plane. The cement used has the refractive index 1.57 at a wavelength of 587.6 nm.

Also presented in Table 1 are: the refractive index for the d-line ($n_d$), the primary dispersion (v) and the relative partial dispersion ($\Delta P$) in accordance with the definitions presented above. Also delineated in Table 1 are the long-crown character L or the short-flint character K of the glasses.

The planar-parallel element after surface 13 is made of normal glass and functions as an exchangeable filter. Of the 17 lenses, a total of 14 lenses have a considerable anomalous partial dispersion.

Behind the system diaphragm 24 in the base group 103, all lenses of a positive refractive power (25, 29, 35, 37) have a long-crown characteristic and the lenses (27, 33) of negative refractive power have a short-flint characteristic as in the above-mentioned Carl Zeiss Distagon 2.8/21 mm.

The first lens 1 of the objective is a convex meniscus of positive refractive power and is on the object end of the objective. This first lens 1 has a pronounced long-crown character in contrast to the rule applied in the above-mentioned known objective. The first lens 1 is made of Hoya ADC 1, which is a glass seldom used, or a like substitute and is made with the following parameters: $n_d=1.620; v=50$ and $\Delta P=-0.0033$.

In this way, and in accordance with the invention, a transverse chromatic aberration is generated which must subsequently be corrected. This transverse chromatic aberration is greater than for a theoretical glass having the same refractive index and primary dispersion but with a vanishing relative partial dispersion. It is, however, possible in this manner to reduce the angle and elevation of the light rays in the region of lenses having surfaces (1, 3, 5, 7) very rapidly whereby the oblique spherical aberration of the sagittal imaging is effectively reduced.

In the entire forward group 101, the same relationship of refractive power and character of the anomalous partial dispersion is maintained as in the base group 103. Only for the third lens having the surfaces (5, 6) with a very high refractive index ($n_d=1.92$) and low primary dispersion (v=15.9), only long-crown glasses which are inconsistent with the system are available so that this system deviation must be accepted.

The center group 102 is built up in an opposite manner and comprises the lenses having surfaces (17, 18; 20, 21; 21, 22). Here, the lenses with surfaces (21, 22) have a positive refractive power and are made of short-flint glasses and those lenses having surfaces (17, 18) have a negative refractive power and are made of long-crown glasses.

The following glasses: Ohara LAH 75 (lenses having surfaces 3, 4; 31, 32); Ohara BPH 45 lenses having surfaces (27, 28) and Ohara BAH 30 lenses having surfaces (15, 16) all having an amount of relative partial dispersion $\Delta P$ below $2 \times 10^{-3}$ can be considered as normal glasses. It is, however, significant that the partial dispersion ΔP thereof (even when small) are in the proper direction.

The composite lens having surfaces (20, 22) comprises two glasses (Hoya TAFD 30, Ohara BPH 35) with different refractive index (n) but with practically the same primary dispersion (v) and with practically the same relative partial dispersion (ΔP). The dispersion functions of both are distinguished therefore only by a constant Δn. The cement interface at surfaces (21, 22) has therefore no effect with respect to spectral correction and can separately act on other errors. Overall, the composite lens having surfaces (20, 22) has a positive refractive power and a short-flint character.

The system deviation of the first lens having surfaces (20, 21) of the composite element lenses having surfaces (20, 22) as short flint results from this special function.

The glass selection for an apochromatic wide-angle objective according to the invention then takes place as delineated below.

In the front group 101, the transverse chromatic aberration for the red spectral range is deliberately magnified already by the first lens having surfaces (1, 2). The objective here is to greatly increase the error in the external field. A demagnification of the transverse chromatic aberration would here lead to the condition that a large undercorrection in the field center (zone) would occur or that an overcorrection would occur at the edge. The rule therefore states for the forward group:

lenses of positive refractive power are made of long-crown glass; and, lenses of negative refractive power are made of short-flint glass.

The refractive index and primary dispersion are, however, pregiven by the primary requirements of the achromatic correction. For this reason, the situation can occur that for the lenses having surfaces (5, 6), no suitable glass is available in the marketplace and nonconforming glass must be utilized, for example, a lens having surfaces (5, 6) of negative refractive power made of long-crown glass.

In the center group 102, the objective is the reduction of transverse chromatic aberration in the entire field and, for this purpose, the rule is the opposite as for the first group 101 and is as follows:

lenses of positive refractive power are made of short-flint glass; and, lenses of negative refractive power are made of long-crown glass.

It is necessary that one lens having surfaces (20, 21) not adhere to the rule in the context of the special configuration of the composite element lenses having surfaces (20, 21, 22) already described.

In the base group 103, and after the system diaphragm 24, it is the objective to completely eliminate the remaining transverse chromatic aberration in the red spectral range, that is, for the C-line.

The rule here is as follows:

lenses of positive refractive power are made of long-crown glass; and, lenses of negative refractive power are made of short-flint glass.

The glasses of higher anomalous partial dispersion ΔP are preferably provided in the center of the base group 103 and this is realized by lenses having surfaces (29, 30) which drastically reduce the transverse chromatic aberration over all image heights (see FIG. 7). The rule is maintained in the embodiment shown. Since the remaining image errors must also be corrected, a smaller transverse chromatic aberration remains in the center of the field (zone).

FIG. 7 shows the transverse chromatic aberration for lines (C, d) plotted as a function of the lenses of the objective for various ray elevations (y). In this, the above color correction can be clearly seen. For comparison, the longitudinal chromatic aberration is also shown. The chromatic aberration is shown in the image plane 39 for simulation computations. In these equations, all lenses are made of glass (which is not really available) having the same refractive index and primary dispersion as presented in the table for the embodiment, but with vanishing relative partial dispersion (ΔP=0).

For focusing the objective, the backfocus distance (spacing 38, 39) is changed, that is, the entire objective is displaced and, at the same time, the front group 101 is shifted with respect to the following center and base groups (102, 103) as a "floating element". The air spacings (18 to 20) and (38, 39) are changed at the same time.

FIG. 2 shows the objective 100 of the invention mounted on a camera 200. The objective includes lens groups (101, 102, 103) and the frame 110 and is attached with an adapter 120 to adapter 220 of the camera 200. The adapter is shown schematically as screw thread. Since the backfocus distance S of the objective 100 (the spacing of the last lens apex of the base group 103 to the image plane 210 in the camera 200) is greater than the spacing of the adapters (120, 220) to the image plane 210, the objective 100 of the invention can be equipped with a shift device (111, 121) to prevent tumbling lines (perspective-compensating wide-angle objective).

The excellent overall quality of the wide-angle objective of Table 1 which is obtained is shown in FIG. 3 wherein the modulation transmission T is shown as a function of the image height (u) for 10, 20 and 40 lines per mm (LPM) sagittally (solid lines) and tangentially (shown dotted) and to the right for the maximum aperture K=3.65, to the left for K=5.6, therefore stopped down by two stop numbers, for white light comprising ten wavelengths from 404.7 nm to 656.3 nm and distance to object is infinity.

The exceptionally stable trace of the modulation transmission T up to large image heights is especially very useful for the embodiment (see FIG. 2) in the form of a shift objective.

Figure 4:
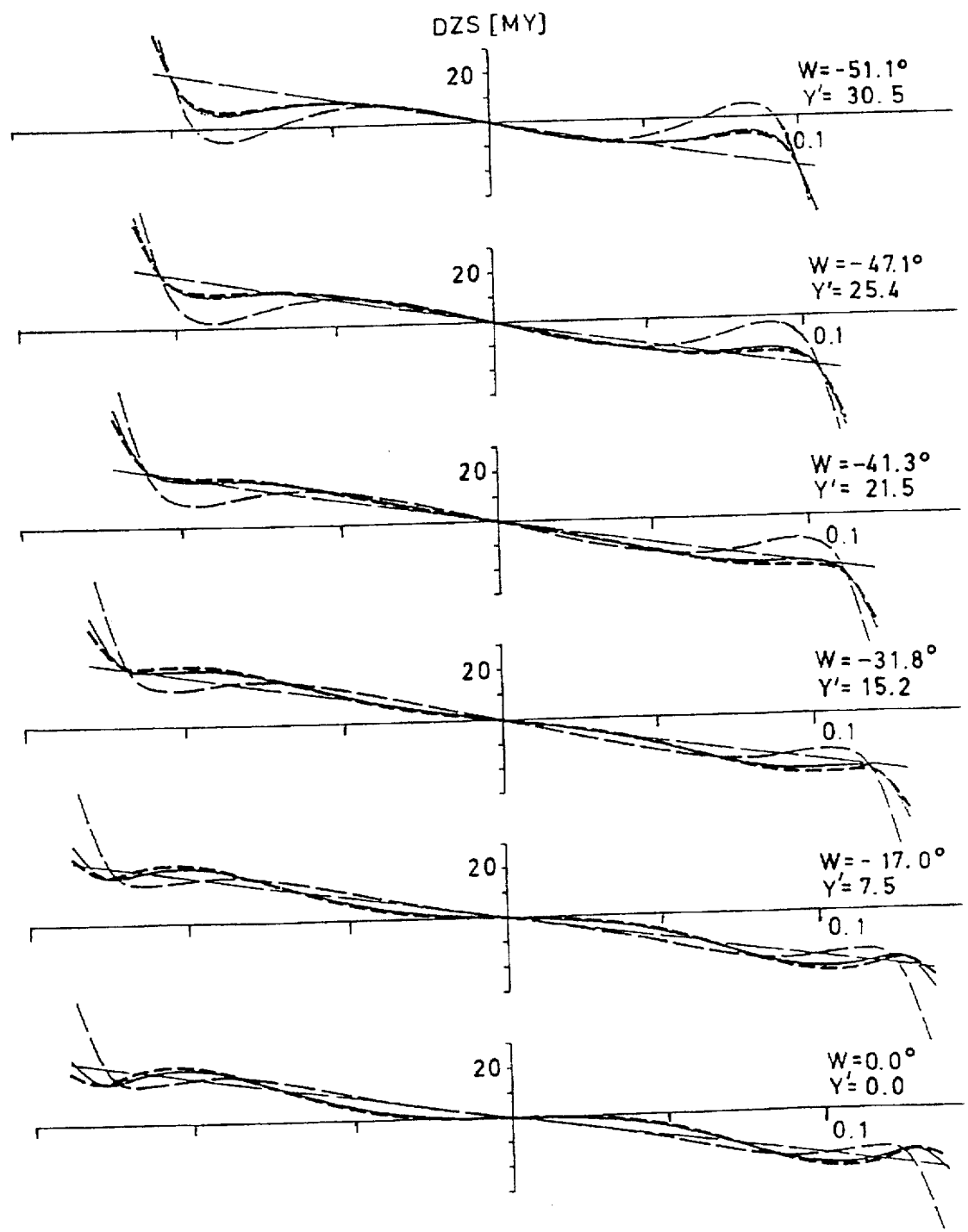
FIG. 4 is a diagram of the total transverse aberration in a sagittal section for the objective of FIG. 1.

FIG. 4 shows a diagram of the total transverse aberration (DZS) in the sagittal section for the same objective for six different image heights (y') or image angles (W) as a function of the tangent of the aperture angle tan DW' for the three spectral lines (d shown as a solid line, g shown as a broken line of long segments and C as a broken line of short segments). The line of the adjusting plane is shown diagonally.

FIG. 5 shows the same but for the meridional section (DYM, total meridional transverse aberration) and FIG. 6 shows the sagittal aberration (DYS) for the same parameters.

All of these errors are well corrected up to large aperture angles and image heights.

It is understood that the foregoing description is that of the preferred embodiments of the invention and that various changes and modifications may be made thereto without departing from the spirit and scope of the invention as defined in the appended claims.

TABLE 1

| Surface | Radius | Thickness | Refractive Power | Glass | Type | $n_d$ | v | $P*10^4$ |
|---|---|---|---|---|---|---|---|---|
| 0 | | | | | | | | |
| 1 | 50.2529 | 8.700 | + | Hoya ADC1 | L | 1.62000 | 50.1 | −33 |
| 2 | 92.0163 | .050 | | | | | | |
| 3 | 32.0126 | 1.000 | − | Ohara LAH75 | K | 1.87400 | 27.4 | +8 |
| 4 | 18.6988 | 10.510 | | | | | | |
| 5 | 54.5994 | 1.500 | − | Ohara PBH71 | L | 1.92286 | 15.9 | −55 |
| 6 | 21.9437 | 4.850 | | | | | | |
| 7 | 62.7726 | 1.500 | − | Hoya TAFD30 | K | 1.88300 | 32.1 | +28 |
| 8 | 23.1902 | 5.380 | | | | | | |
| 9 | −176.8511 | 4.150 | − | Ohara LAM54 | K | 1.75700 | 38.1 | +26 |
| 10 | 35.9626 | 1.920 | | | | | | |
| 11 | 97.3607 | 4.000 | + | Ohara PBH71 | L | 1.92286 | 15.9 | −55 |
| 12 | −77.8342 | 1.180 | | | | | | |
| 13 | infinite | 1.500 | 0 | Ohara NSL51 | Filter | | | |
| 14 | infinite | 1.180 | | | | | | |
| 15 | 42.2118 | 17.870 | + | Ohara BAH30 | L | 1.65016 | 30.7 | −11 |
| 16 | −23.5400 | .010 | | Cement | | | | |
| 17 | −23.5300 | 2.150 | − | Ohara PBH71 | L | 1.92286 | 15.9 | −55 |
| 18 | −32.4246 | 2.510 | | | | | | |
| 19 | infinite | 1.490 | | | | | | |
| 20 | 78.2780 | 9.490 | − | Hoya TAFD30 | K | 1.88300 | 32.2 | +28 |
| 21 | 12.2789 | .010 | | Cement | | | | |
| 22 | 12.2811 | 7.404 | + | Ohara BPH35 | K | 1.64450 | 32.1 | +29 |
| 23 | −40.1660 | .500 | | | | | | |
| 24 | infinite | 2.560 | | Diaphragm | | | | |
| 25 | −45.2866 | 4.500 | + | Hoya ADC1 | L | 1.62000 | 50.1 | −33 |
| 26 | −11.5460 | .010 | | Cement | | | | |
| 27 | −11.5430 | .740 | − | Ohara BPH45 | K | 1.71850 | 25.9 | +8 |
| 28 | −29.6646 | .060 | | | | | | |
| 29 | 26.5153 | 3.840 | + | Hoya ATF2 | L | 1.65052 | 29.1 | −71 |
| 30 | −25.9265 | .180 | | | | | | |
| 31 | −56.0023 | .960 | − | Ohara LAH75 | K | 1.87400 | 27.4 | +8 |
| 32 | 29.9968 | 3.250 | | | | | | |
| 33 | −21.5144 | .690 | − | Hoya TAFD30 | K | 1.88300 | 32.2 | +28 |
| 34 | 28.9861 | .010 | | Cement | | | | |
| 35 | 29.0109 | 6.890 | + | Ohara FPL51 | L | 1.49700 | 66.2 | −142 |
| 36 | −18.0911 | .250 | | | | | | |
| 37 | −95.1794 | 3.000 | + | Ohara FPL51 | L | 1.49700 | 66.2 | −142 |
| 38 | −31.5296 | | | | | | | |
| 39 | | 47.791 | | (backfocus distance S) | | | | |

What is claimed is:

1. An apochromatic wide-angle objective for viewing an object, the objective comprising:

a plurality of lenses defining an optical axis and more than half of said lenses having anomalous partial dispersion;

said plurality of lenses being subdivided into forward, center and base groups of lenses;

a system diaphragm mounted on said axis between said center group and said base group;

said base group including a first plurality of converging lenses and a second plurality of diverging lenses;

more than half of said converging lenses of said base group being made of a long-crown type glass and more than half of said diverging lenses of said base group being made of short-flint type glass;

said forward group having a third plurality of lenses having a positive refractive power and a fourth plurality of lenses having a negative refractive power;

more than half of the lenses of said third plurality of lenses including a front lens being made of long-crown type of glass and more than half of the lenses of said fourth plurality of lenses being made of short-flint type glass;

said center group having a fifth plurality of lenses having a positive refractive index and a sixth plurality of lenses having a negative refractive index; and, more than half of lenses of said fifth plurality of glasses being made of short-flint type glass and more than half of the lenses of said sixth plurality being made of long-crown type glass.

2. The apochromatic wide-angle objective of claim 1, wherein said forward and center groups comprise up to seven lenses; and, at most two of said lenses of said forward and center groups are missing the rules given in claim 1 for more than half of each of the first to sixth pluralities of lenses.

3. The apochromatic wide-angle objective of claim 1, wherein said forward and center groups comprise more than seven lenses; and, at most three of said lenses of said forward and center groups are missing the rules given in claim 1 for more than half of each of the first to sixth pluralities of lenses.

4. The apochromatic wide-angle objective of claim 1, said forward group of lenses having a front lens facing toward the object; said front lens being made of a long-crown type of glass and generating a transverse chromatic aberration which is greater than for a conventional glass otherwise having the same characteristics.

5. The apochromatic wide-angle objective of claim 1, said front lens being a meniscus having a convex front surface.

6. The apochromatic wide-angle objective of claim 1, said center group including a composite lens having two component lenses made of glasses having dispersion functions (n, (λ)) which differ only by a constant in the spectral range used.

7. The apochromatic wide-angle objective of claim 1, wherein said transverse chromatic aberration is corrected for three wavelengths (g, d, C) over all field angles.

8. The apochromatic wide-angle objective of claim 7, wherein said transverse chromatic aberration is corrected with an error less than ±5 micrometers.

9. The apochromatic wide-angle objective of claim 7, wherein the oblique spherical aberration of sagittal imaging is well corrected.

10. The apochromatic wide-angle objective of claim 1, wherein said objective is configured as a retrofocus objective.

11. The apochromatic wide-angle objective of claim 10, wherein said objective is an exchangeable objective adapted for mounting on a camera; said objective and said camera conjointly defining a device for connecting said objective to said camera; said camera having an image plane and said objective having a last lens facing toward said image plane; and, said last lens having an apex which does not extend beyond said device.

12. The apochromatic wide-angle objective of claim 10, wherein said objective is configured as a shift objective.

13. The apochromatic wide-angle objective of claim 1, wherein at least one of said lenses has characteristics of a glass Hoya ATF2.

14. The apochromatic wide-angle objective of claim 1, wherein at least one of said lenses has characteristics of a glass Hoya ADC1.

15. The apochromatic wide-angle objective of claim 1, comprising a focal length of 25 mm; a numerical aperture of 0.14; an image end back focal distance of 48 mm; and, for all image angles up to 51° in the spectral range of the lines g to C, a total transverse aberration (DZS) in the sagittal section of less than 30 µm for all tangents of the aperture angle (tanDW') less than 0.1; a total transverse aberration DYM) in the meridional section less than 30 µm for all tangents of the aperture angle (tanDW') less than 0.5; and, a sagittal coma (DYS) less than 30 µm for all tangents of the aperture angle (tanDW') less than 0.1.

16. The apochromatic wide-angle objective of claim 1, wherein up to fully opened diaphragm K=3.65 for white light in the spectral range of the lines g to C, the modulation transfer (T) sagittally and tangentially for 10 lines per mm up to an image height (YB) of 20 mm is greater than 90%, up to an image height (YB) of 30 mm is still greater than 80%, and for 40 lines per mm up to an image height (YB) of 20 mm is greater than 60%, and for an image height (YB) of 30 mm is still greater than 50%.

17. The apochromatic wide-angle objective of claim 1, wherein: the refractive index for the wavelength 435.84 nm is $n_g$; the refractive index for the wavelength 587.56 nm is $n_d$; the refractive index for the wavelength 657.27 nm is $n_C$; with the definition of the primary dispersion being given by:

$$v = \frac{n_d - 1}{n_g - n_d}$$

with the definition of the partial dispersion being given by $$P = \frac{n_d - n_C}{n_g - n_d}$$

and the Abbe normal for the glasses (K2, F7) being given by:

$$P_n = A\,v + B$$

wherein:

$A = 0.9007 \cdot 10^{-4}$ and $B = 0.2025$ and the deviation from the normal $$\Delta P = P - P_n = P - A v - B$$

wherein:

$\Delta P$ is negative for all long crown glass;

$\Delta P$ is positive for all short flint glass;

all glasses used having an amount $\Delta P$ greater than $8 \cdot 10^{-4}$; and, at least half the glasses an amount $\Delta P$ greater than $2.5 \cdot 10^{-3}$.

18. An objective comprising the following characteristics:

focal length 25 mm largest diaphragm 3.65

| Surface | Radius | Thickness | Glass | Type |
|---|---|---|---|---|
| 1 | 50.2529 | 8.70 | Hoya ADC1 | L |
| 2 | 92.0163 | .05 | | |
| 3 | 32.0126 | 1.00 | Ohara LAH75 | K |
| 4 | 18.6988 | 10.51 | | |
| 5 | 54.5994 | 1.50 | Ohara PBH71 | L |
| 6 | 21.9437 | 4.85 | | |
| 7 | 62.7726 | 1.50 | Hoya TAFD30 | K |
| 8 | 23.1902 | 5.38 | | |
| 9 | −176.8511 | 4.15 | Ohara LAM54 | K |
| 10 | 35.9626 | 1.92 | | |
| 11 | 97.3607 | 4.00 | Ohara PBH71 | L |
| 12 | −77.8342 | 1.18 | | |
| 13 | infinite | 1.50 | Ohara NSL51 | |
| 14 | infinite | 1.18 | (Filter) | |
| 15 | 42.2118 | 17.87 | Ohara BAH30 | L |
| 16 | −23.5400 | .01 | Cement | |
| 17 | −23.5300 | 2.15 | Ohara PBH71 | L |
| 18 | −32.4246 | 2.51 | | |
| 19 | infinite | 1.49 | | |
| 20 | 78.2780 | 9.49 | Hoya TAFD30 | K |
| 21 | 12.2789 | .01 | Cement | |
| 22 | 12.2811 | 7.40 | Ohara BPH35 | K |
| 23 | −40.1660 | .50 | | |
| 24 | infinite | 2.56 | System Diaphragm | |
| 25 | −45.2866 | 4.50 | Hoya ADC1 | L |
| 26 | −11.5460 | .01 | Cement | |
| 27 | −11.5430 | .74 | Ohara BPH45 | K |
| 28 | −29.6646 | .06 | | |
| 29 | 26.5153 | 3.84 | Hoya ATF2 | L |
| 30 | −25.9265 | .18 | | |
| 31 | −56.0023 | .96 | Ohara LAH75 | N |
| 32 | 29.9968 | 3.25 | | |
| 33 | −21.5144 | .69 | Hoya TAFD30 | K |
| 34 | 28.9861 | .01 | Cement | |
| 35 | 29.0109 | 6.89 | Ohara FPL51 | L |
| 36 | −18.0911 | .25 | | |
| 37 | −95.1794 | 3.00 | Ohara FPL51 | L |
| 38 | −31.5296 | | | |
| 39 | | 47.79 | (backfocus distance) | | or a different focal length with all radii and distances changed in proportion thereto.

19. An apochromatic wide-angle objective for viewing an object, the objective comprising:

a plurality of lenses defining an optical axis and more than half of said lenses having anomalous partial dispersion;

said plurality of lenses being subdivided into first and second groups of lenses;

a system diaphragm mounted on said axis between said first and second groups;

said first group of lenses having a front lens facing toward the object;

said front lens being a converging lens made of a long-crown type of glass;

said second group of lenses including a plurality of converging lenses and a plurality of diverging lenses; and, more than half of said converging lenses of said second group being made of a long-crown type of glass and more than half of said diverging lenses of said second group being made of a short-flint type of glass.

\* \* \* \* \*